United States Patent
McKenzie et al.

(10) Patent No.: US 6,538,837 B1
(45) Date of Patent: Mar. 25, 2003

(54) METHOD OF ALIGNING SERVO WEDGES IN A DISC DRIVE

(75) Inventors: Lealon R. McKenzie, Edmond, OK (US); Brian W. Sudman, Eden Prairie, MN (US); Michael Baum, Longmont, CO (US); Dennis D. Duffy, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/475,771

(22) Filed: Dec. 30, 1999

Related U.S. Application Data

(60) Provisional application No. 60/115,325, filed on Jan. 11, 1999.

(51) Int. Cl.$^7$ ................................................ G11B 21/02
(52) U.S. Cl. ........................................... 360/75; 300/57
(58) Field of Search ................................. 360/75, 77.02, 360/77.07, 77.11, 78.04, 15, 57, 73.03

(56) References Cited

U.S. PATENT DOCUMENTS 5,262,907 A    11/1993   Duffy et al. ............. 360/77.05
6,064,541 A  * 5/2000   Sasamoto et al. ........ 360/77.05

* cited by examiner

Primary Examiner—Regina N. Holder
Assistant Examiner—Mitchell Slavitt
(74) Attorney, Agent, or Firm—Westman, Champlin & Kelly, P.A.

(57) ABSTRACT

One embodiment of the present invention is directed to a method of aligning servo wedges of a plurality of disc surfaces in a disc drive. This process of aligning servo wedges in a disc drive includes writing multiple servo wedges, one adjacent another, continuously across an entire circumference of each disc surface. Subsequently, one of the disc surfaces is designated the master surface. Every $n^{th}$ servo wedge on the master surface is then designated as a master wedge, where n is a positive integer. Next, the servo wedges on the non-master surfaces which are most closely axially aligned with the master wedges are selected. Subsequently, all of the non-selected and non-master wedges are erased.

11 Claims, 4 Drawing Sheets

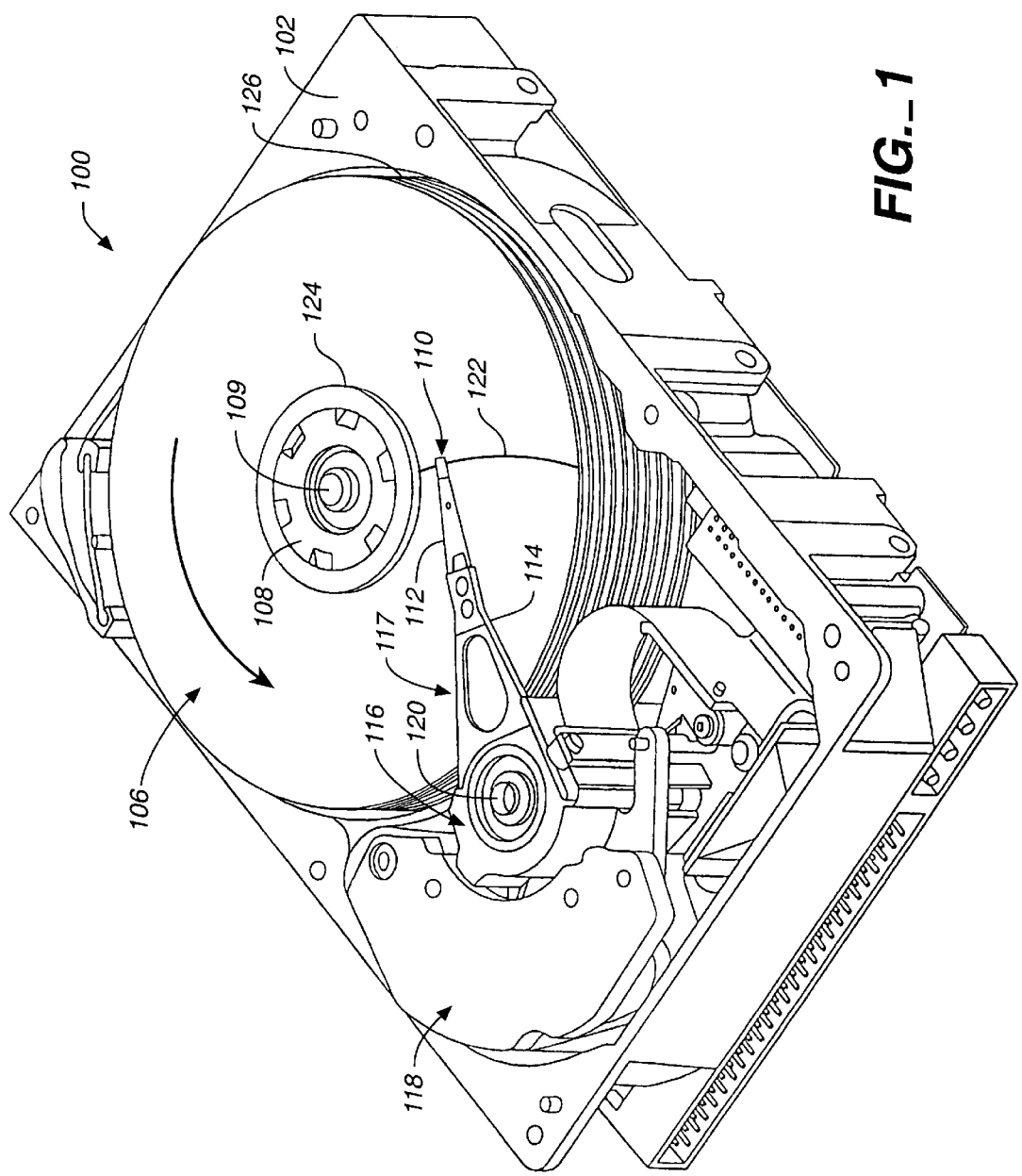
FIG._1

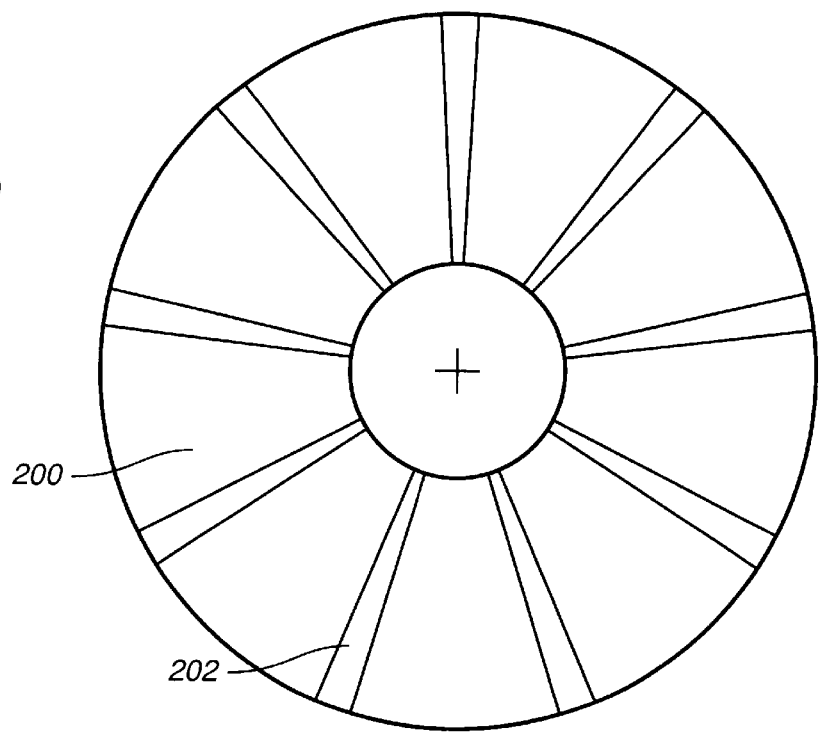
FIG._2
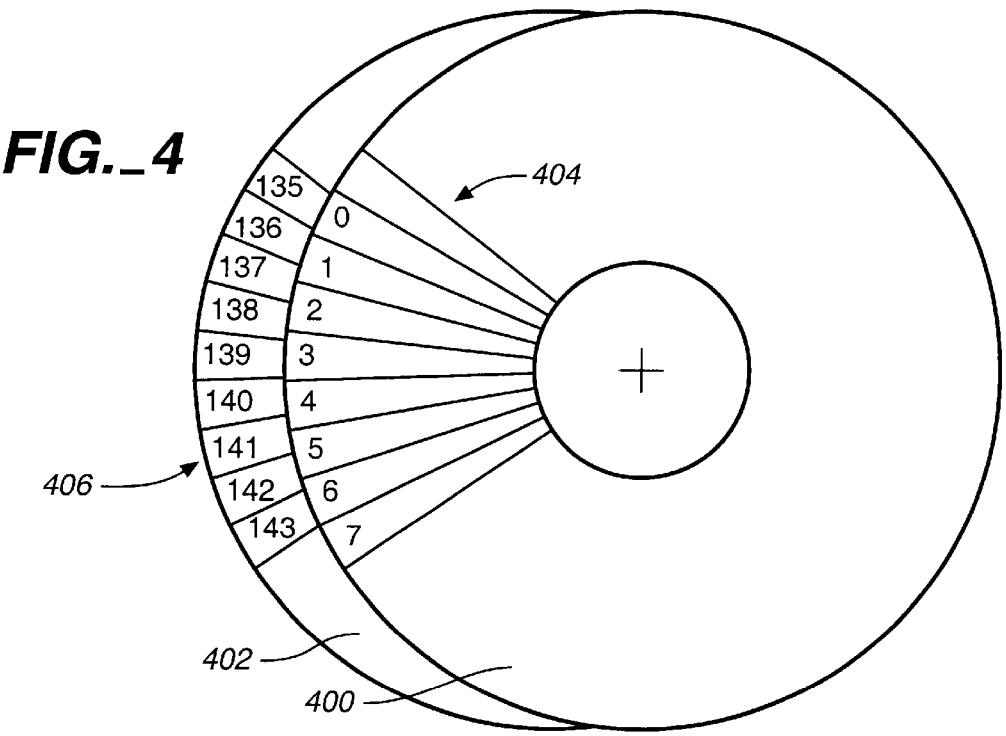
FIG._4

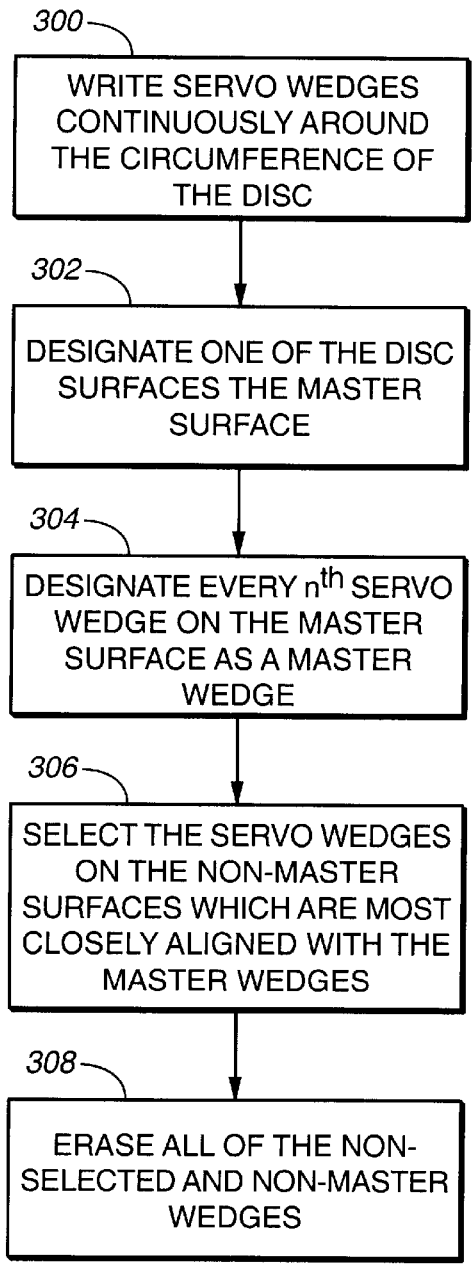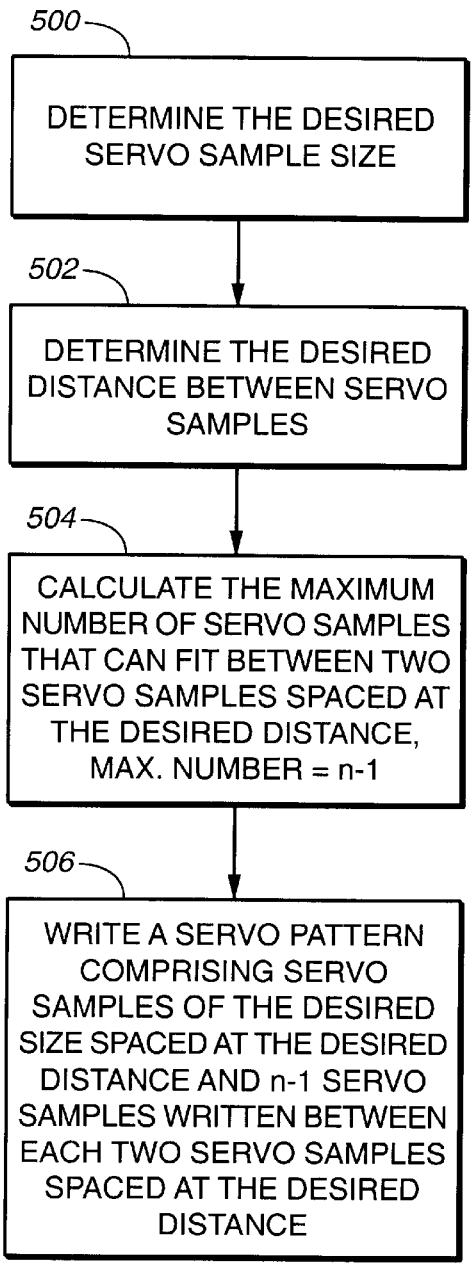
FIG._3
FIG._5

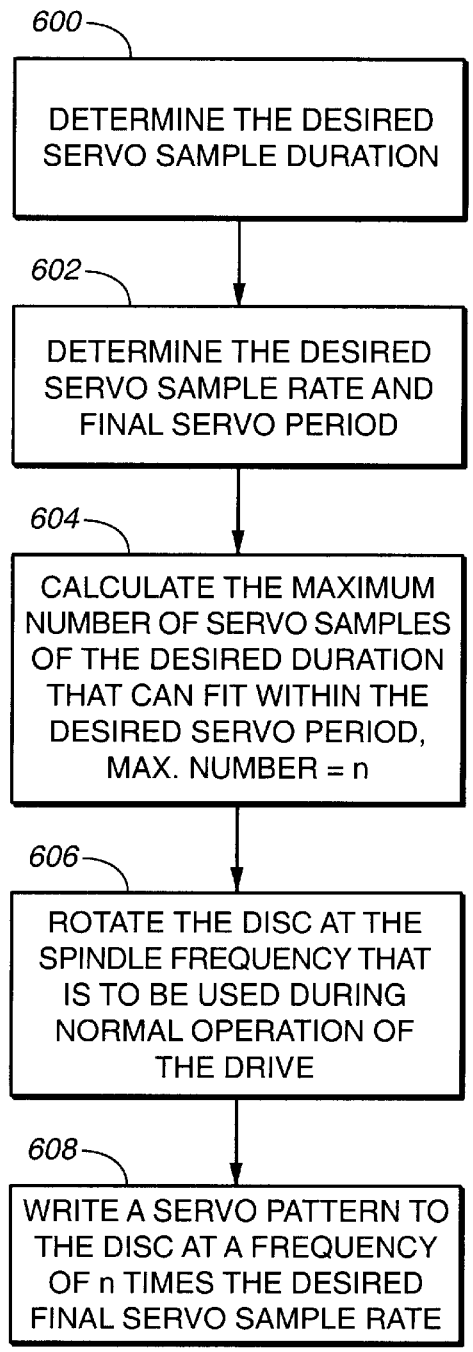
FIG._6
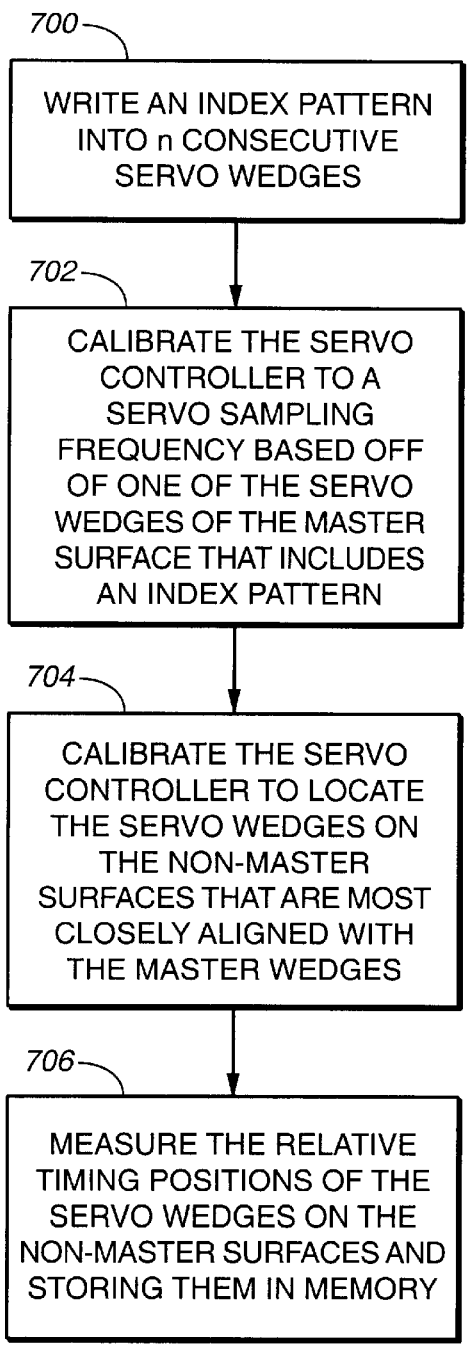
FIG._7

METHOD OF ALIGNING SERVO WEDGES IN A DISC DRIVE

CROSS-REFERENCE TO RELATED APPLICATION

This application claims the benefit of U.S. Provisional Patent Application No. 60/115,325 entitled "ALIGNING SINGLE SERVO WRITTEN DISCS INTO A DISC DRIVE," filed on Jan. 11, 1999.

FIELD OF THE INVENTION

The present invention relates generally to disc drive data storage systems. More particularly, the present invention relates to aligning servo wedges in a disc drive.

BACKGROUND OF THE INVENTION

A disc drive includes one or more magnetic discs that are capable of storing data. Typically multiple discs are mounted in a disc stack for rotation on a hub or spindle. A typical disc drive also includes one or more transducers supported by a hydrodynamic air bearing which flies above each magnetic disc. The transducers and the hydrodynamic air bearing are collectively referred to as a data head. A drive controller is conventionally used for controlling the disc drive system based on commands received from a host system. The drive controller controls the disc drive to retrieve information from the magnetic discs and to store information on the magnetic discs. An electromechanical actuator operates within a servo system to move the data head radially over the disc surface for track seek operations and to hold the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on a magnetic disc, and consequently represented in the read signal provided by the data head.

Accurate positioning of the data head over a track on the disc is of great importance in writing data to the disc and reading data from the disc.

In prior systems, servo operations were accomplished based on a dedicated servo head. In a dedicated servo type of system, servo information is all written to one dedicated surface of a disc in the disc drive. All of the heads in the disc drive are mechanically coupled to the servo head which is used to access the servo information. Thus, all of the heads in the dedicated servo disc drive are positioned based on the servo information read from the servo surface. This type of system allows the disc drive to conveniently execute parallel read and write operations. In other words, with appropriate circuitry in the drive controller, read and write operations can be executed in parallel using a plurality of the data heads mounted on the actuator, the data heads being simultaneously positioned based on the servo information read from the dedicated servo surface.

However, track densities on magnetic discs have been increasing for many years. Increased track densities on the magnetic disc require more accurate and higher resolution positioning. The mechanical offset between heads in a dedicated servo system can exceed one track width. Thus, the industry has seen a shift to embedded servo information in certain applications.

In an embedded servo system, servo information is embedded on each track on each surface of every disc. Thus, each data head returns a position signal independently of the other data heads. Therefore, the servo actuator is used to position each individual data head while that particular data head is accessing information on the disc surface. The positioning is accomplished using the embedded servo data for the track over which the data head is then flying. Typically, the servo data is written as a plurality of servo wedges that extend radially from the center of the disc to the outer edge of the disc. Typically the servo wedges are equally spaced about the circumference of the disc surface.

In an embedded servo system, operation of the servo system is more efficient when the servo wedges of the various disc surfaces are aligned with each other in relation to the spindle. One existing method of aligning the servo wedges is to write the servo wedges to the entire disc pack in one operation. However, writing the servo wedges to the entire disc pack in one operation typically requires the use of the disc drive's ball-bearing spindle to rotate the disc stack during the writing of the servo wedges. When the discs are servo-written using the ball-bearing spindle, the ball-bearing spindle motion gets written into the servo wedges. This can result in a significant amount of written-in repeatable run-out in the servo track. To reduce the amount of written-in repeatable run-out in the servo track, the servo wedges can be written to each disc, one at a time, on an air-bearing spindle, which is smoother than the disc drive's ball-bearing spindle. However, presently there is not an efficient method of aligning the servo wedges when the servo wedges are written to each disc individually.

The present invention provides a solution to this and other problems and offers other advantages over the prior art.

SUMMARY OF THE INVENTION

The present invention relates to aligning servo wedges in a disc drive.

One embodiment of the present invention is directed to a method of aligning servo wedges of a plurality of disc surfaces in a disc drive. Pursuant to the method, multiple servo wedges are written, one adjacent another, continuously across an entire circumference of each disc surface. Then one of the disc surfaces is designated the master surface. Every $n^{th}$ servo wedge on the master surface is then designated as a master wedge, where n is a positive integer. Next, the servo wedges on the non-master surfaces which are most closely axially aligned with the master wedges are selected. Then all of the non-selected and non-master wedges are erased.

In one embodiment of the present invention, writing the servo wedges continuously across the entire circumference of the disc involves the following steps. The desired servo sample duration, the desired final servo sample rate and the desired final servo period are determined. Then the maximum number of servo samples of the desired duration that can fit within the desired final servo period is calculated. A variable, n, is used to represent the maximum number of samples. The disc is rotated at the spindle frequency which is to be employed during normal operation of the disc drive. A servo pattern is then written to the disc at a frequency equal to n times the desired final servo sample rate.

These and various other features as well as advantages which characterize the present invention will be apparent upon reading of the following detailed description and review of the associated drawings.

BRIEF DESCRIPTION OF THE DRAWINGS

FIG. 1 is a top view of a disc drive in accordance with an illustrative embodiment of the present invention.

FIG. 2 is a top view of a disc including a plurality of servo fields produced by a method of the present invention.

FIG. 3 is a flow chart representing a method of aligning servo wedges in a disc drive in accordance with an illustrative embodiment of the present invention.

FIG. 4 is a top view of two data storage discs having servo wedges written continuously about the circumference in accordance with an illustrative embodiment of the present invention.

FIG. 5 is a flow chart representing a method of writing servo wedges continuously about the circumference of a disc in accordance with an illustrative embodiment of the present invention.

FIG. 6 is a flow chart representing a method of writing servo wedges continuously about the circumference of a disc in accordance with an illustrative embodiment of the present invention.

FIG. 7 is a flow chart representing a method of aligning servo wedges in a disc drive in accordance with an illustrative embodiment of the present invention.

DETAILED DESCRIPTION OF ILLUSTRATIVE EMBODIMENTS

FIG. 1 is a top view of a disc drive 100 in accordance with one embodiment of the present invention. Disc drive 100 includes a disc pack 106 mounted for rotation about spindle 109. Disc pack 106 includes a plurality of individual discs, each of which include concentric tracks, or cylinders, for receiving and storing data in the form of magnetic flux reversals encoded on the tracks. It should be noted that although the present invention is described herein with reference to a magnetic disc system, the invention is equally applicable to disc drives which utilize discs employing other means of data storage, such as optical discs. Disc drive 100 also includes an actuator 116 mounted to a base 102 and pivotally moveable relative to discs 106 about pivot shaft 120. Actuator 116 includes an actuator arm assembly 117 which includes a plurality of actuator arms 114. Each actuator arm 114 is attached to one or more flexure arms 112. Each flexure arm 112 supports a data head 110. Data head 110 includes a hydrodynamic air bearing, or slider, which supports a transducer for reading information from and encoding information to one of the discs 106. In a preferred embodiment, actuator 116 includes a voice coil motor, shown generally at 118. Disc drive 100 further includes a drive controller (not shown) which is coupled to a host system or another controller which controls a plurality of drives. In an illustrative embodiment, the drive controller is a microprocessor, or digital computer. The drive controller is either mountable within disc drive 100, or is located outside of disc drive 100 with suitable connection to actuator 116.

According to the present invention, an embedded servo system is used to position the data head 110 over the desired track. In an embedded servo system, servo information is embedded on each track on each surface of every disc 106. During operation, the drive controller receives desired position information indicating a track of the disc 106 to be accessed. The drive controller receives the desired-position information from an operator, from a host computer, or from another suitable controller. Meanwhile, the actual position of the head 110 is determined by sensing the servo data written on the disc 106. Based on the difference between the desired position and the actual position of the head 110, the drive controller provides a control signal to actuator 116. The control signal causes actuator 116 to pivot about pivot shaft 120. In an illustrative embodiment, the position signal comprises a current supplied to the voice coil motor 118, causing actuator 116 to pivot about pivot shaft 120. This, in turn, causes data head 110 to move radially over the surface of the disc 106 in a generally arcuate path, indicated by arrow 122, to the desired position.

Each data head 110 returns an actual-position signal independently of the other data heads. Therefore, the servo actuator is used to position each individual data head 110 while that particular data head 110 is accessing information on the disc surface. The positioning is accomplished using the embedded servo data for the track over which the data head 110 is then flying.

The servo data is written as a plurality of servo wedges 202 that extend radially from the center of the disc to the outer edge of the disc as shown in FIG. 2, which is a top view of a disc surface 200. Each servo wedge include servo information that identifies the position of a head flying over the servo wedge. In an illustrative embodiment, the servo wedges are equally spaced about the circumference of the disc surface.

In an embedded servo system, operation of the servo system is more efficient when the servo wedges of the various disc surfaces are aligned with each other in relation to the spindle. The present invention discloses an efficient method of aligning the servo wedges.

FIG. 3 is a flow chart representing a method of aligning servo wedges in a disc drive in accordance with an illustrative embodiment of the present invention. In step 300, multiple servo wedges are written, one adjacent another, continuously across an entire circumference of each disc surface. The result of this step is shown in FIG. 4, which shows two disc surfaces 400 and 402, each containing servo wedges 404, 406 written continuously around the entire circumference of the disc. For simplicity's sake, FIG. 4 shows the continuously written servo wedges 404, 406 on only a certain segment of the disc surfaces 400, 402, but pursuant to the present invention, the servo wedges wrap all the way around the circumference of the disc surface. Because the servo wedges 404, 406 are written directly adjacent one another, in this stage of the process, none of the disc surface is available for data storage.

After writing servo wedges continuously around each disc surface, the discs are assembled arbitrarily onto a spindle in a disc drive. Referring now back to FIG. 3, in step 302, one of the disc surfaces is designated the master surface. For example, the bottom disc surface in the disc stack might be designated the master surface. In step 304, every $n^{th}$ servo wedge on the master surface is then designated as a master wedge, where n is a positive integer. The selection of the value of integer n will depend the desired distance between servo wedges, because the master wedges will end up, at the end of this process, to be the servo wedges on the master surface. That is, the master wedges will be the servo wedges used during normal operation of the disc drive. For example, every ninth one of the continuously written servo wedges might be designated as master wedges.

In step 306, the servo wedges on the other, i.e., nonmaster, surfaces that are most closely axially aligned with the master wedges are selected. Going back to the example used above, every ninth servo wedge (the ones most closely aligned with the master wedges) on the other surfaces would be selected. Then, in step 308, all of the non-selected and non-master wedges are erased, leaving only the master wedges on the master surface and the selected wedges on the other surfaces. In an illustrative embodiment, the erasing of the unwanted servo wedges is achieved by formatting the disc drive. Preferably, the formatting process used is more complex than the standard format. Off-track writes are performed to completely erase unwanted servo wedges and reduce the possibility of the servo demodulator trying to lock to a partially erased servo wedge during the first power-up.

After erasing the unwanted servo wedges, the remaining servo wedges will be closely aligned. Any remaining misalignment is easily compensated for in the timing of the servo controller. After employing this method, the servo wedges will be arranged as shown in FIG. 2 and the wedges of the various discs will be aligned with each other.

FIG. 5 is a flow chart representing a method of writing servo wedges continuously about the circumference of a disc in accordance with an illustrative embodiment of the present invention. At step 500, the desired angular size of the servo samples is determined. At step 502, the desired final angular distance between the centers of adjacent servo samples is determined. Here, "final" refers to the distance between servo samples which is to be employed during normal operation of the disc drive. At step 504, the maximum integer number of servo samples of the desired angular size that can fit between adjacent servo samples spaced at the desired final angular distance is determined. The maximum number of samples is defined as n−1, where n is a positive integer. At step 506, a servo pattern is written to the disc. The servo pattern includes servo samples of the desired angular size spaced at the desired final angular distance. The servo pattern further includes n−1 servo samples written between each two adjacent servo samples spaced at the desired final angular distance.

FIG. 6 is a flow chart representing another method of writing servo wedges continuously about the circumference of a disc in accordance with an illustrative embodiment of the present invention. At step 600, the desired servo sample duration is determined. For example, the desired duration of a servo sample might be 2.8 μsec (microseconds). In other words, during normal operation of the drive, it would take 2.8 μsec for an entire servo sample to pass beneath the data head. At step 602, the desired final servo sample rate and the desired final servo period are determined. For example, the desired servo sample rate of the drive might be 37 kHz (kilohertz). In this case the servo period would be approximately 27 μsec. Thus, in ordinary operation of the drive one servo sample would be taken every 27 μsec. At step 604, the maximum integer number of servo samples of the desired duration that can fit within the desired final servo period is calculated. A variable, n, is used to represent the maximum number of samples. In the present example, the maximum integer number of servo samples that could fit within the servo period would be 9 (27 μsec/2.8 μsec=9.64) Thus, n would be 9. At step 606, the disc is rotated at the spindle frequency which is to be employed during normal operation of the disc drive. Then, at step 608, a servo pattern is written to the disc at a frequency equal to n times the desired final servo sample rate. In the present example, then, the servo pattern would be written at 9×37 kHz=333 Khz.

FIG. 7 is a flow chart representing a method of aligning servo wedges in a disc drive in accordance with an illustrative embodiment of the present invention. This method is used together with the method represented by FIG. 3. At step 700, after writing servo wedges continuously around the circumference of the disc surface, an index pattern is written into n consecutive servo wedges on each disc surface, where n is a positive integer. In the example used above, an index pattern would be written into nine consecutive servo wedges on each disc surface. At step 702, the servo controller is calibrated to a servo sampling frequency based off of one of the servo wedges of the master surface that includes an index pattern. The servo wedge off of which the servo sampling frequency is based will be referred to as the master index wedge. The servo sampling frequency is calibrated such that every $n^{th}$ servo sample is sampled. Thus in the example scenario, one of the servo wedges on the master surface that has an index pattern would be used to lock a servo sampling frequency that would sample every ninth servo wedge, which would be a sampling frequency of 37 kHz. At step 704, the servo controller is calibrated to locate the servo wedges on the non-master surfaces which are most closely axially aligned with the master index wedge. In other words, the servo controller adjusts its timing window to find the closest servo wedge on the other surfaces. At step 706, the relative timing positions of the index wedges on the non-master surfaces are measured and stored in computer memory, so the servo timing windows can be optimized as is done today in some disc drives. In an illustrative embodiment, the relative timing positions are stored in RAM, flash memory, or a combination thereof.

In summary, one embodiment of the present invention is directed to a method of aligning servo wedges 202 of a plurality of disc surfaces 106 in a disc drive 100. Pursuant to the method, multiple servo wedges. 404, 406 are written, one adjacent another, continuously across an entire circumference of each disc surface 400, 402. Then one of the disc surfaces 400, 402 is designated the master surface. Every $n^{th}$ servo wedge on the master surface is then designated as a master wedge, where n is a positive integer. Next, the servo wedges 404, 406 on the non-master surfaces 400, 402 which are most closely axially aligned with the master wedges are selected. Then all of the non-selected and non-master wedges are erased.

In one embodiment of the present invention, writing the servo wedges 404, 406 continuously across the entire circumference of the disc surface 400, 402 involves the following steps. The desired servo sample duration, the desired final servo sample rate and the desired final servo period are determined. Then the maximum number of servo samples 404, 406 of the desired duration that can fit within the desired final servo period is calculated. A variable, n, is used to represent the maximum number of samples 404, 406. The disc 106 is rotated at the spindle frequency which is to be employed during normal operation of the disc drive 100. A servo pattern is then written to the disc surface 400, 402 at a frequency equal to n times the desired final servo sample rate.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the method of aligning servo wedges may be employed in disc drives that use non-magnetic data storage means, for example, optical storage devices, without departing from the scope and spirit of the present invention. Other modifications can also be made.

What is claimed is:

1. A method of aligning servo wedges of a plurality of disc surfaces in a disc drive having a spindle defining an axis, comprising steps of:

(a) writing a plurality of servo wedges, one adjacent another, substantially continuously around an entire circumference of each disc surface;

(b) designating one of the plurality of disc surfaces as a master surface;

(c) designating every $n^{th}$ servo wedge on the master surface as a master wedge, where n is a positive integer;

(d) selecting the servo wedges on the non-master surfaces that are most closely axially aligned with the master wedges; and (e) erasing all of the non-selected and non-master wedges.

2. The method of claim 1 wherein writing step (a) comprises:

(a)(i) determining a desired servo sample angular size;

(a)(ii) determining a desired final angular distance between centers of adjacent servo samples;

(a)(iii) calculating a maximum integer number of servo samples of the desired angular size that can fit between two servo samples spaced at the desired final angular distance, the maximum integer number of samples being equal to n−1, where n is a positive integer; and (a)(iv) writing a servo pattern comprising servo samples of the desired angular size spaced at the desired final angular distance and n−1 servo samples written between each two adjacent servo samples spaced at the desired final angular distance.

3. The method of claim 1 wherein writing step (a) comprises:

(a)(i) determining a desired servo sample duration;

(a)(ii) determining a desired final servo sample rate and a desired final servo period;

(a)(iii) calculating a maximum integer number of servo samples of the desired duration that can fit within the desired final servo period, the maximum integer number of samples being equal to n, where n is a positive integer;

(a)(iv) rotating the disc at a spindle frequency that is to be employed during normal operation of the disc drive; and (a)(v) writing a servo pattern to the disc surface at a frequency equal to n times the desired final servo sample rate.

4. The method of claim 1 further comprising a step (f), prior to step (b), of arbitrarily assembling the plurality of disc surfaces into a disc drive.

5. The method of claim 1 wherein writing step (a) further comprises writing an index pattern into n consecutive servo wedges on each disc surface, where n is a positive integer.

6. The method of claim 5 wherein designating step (c) comprises calibrating a servo controller to a servo sampling frequency based off of one of the servo wedges of the master surface that includes an index pattern, the servo sampling frequency sampling every $n^{th}$ servo sample, the servo wedge off of which the servo sampling frequency is based being designated a master index wedge.

7. The method of claim 6 wherein selecting step (d) comprises calibrating the servo controller to locate the servo wedges on the non-master surfaces which are most closely axially aligned with the master index wedge.

8. The method of claim 7 wherein selecting step (d) further comprises measuring the timing positions of the index wedges on the non-master surfaces relative to the servo wedge most closely aligned with the master index wedge and storing the relative timing positions in computer memory, so as to optimize servo timing of the disc drive.

9. The method of claim 1 wherein erasing step (e) comprises formatting the disc drive.

10. The method of claim 9 wherein formatting the disc drive comprises performing off-track write operations, so as to completely erase the unwanted servo wedges.

11. A disc drive comprising:

at least one data storage disc having a plurality of disc surfaces arranged about a spindle defining an axis, each disc surface including a plurality of servo wedges; and means for axially aligning the servo wedges on the plurality of disc surfaces.

\* \* \* \* \*